United States Patent [19]
Petrisko et al.

[11] Patent Number: 5,895,279
[45] Date of Patent: Apr. 20, 1999

[54] BUSWAY PLUG IN BRICK AND COVER

[75] Inventors: John Dennis Petrisko, West Mifflin; Paul Anthony Colbaugh, Pittsburgh, both of Pa.

[73] Assignee: Eaton Corporation, Cleveland, Ohio

[21] Appl. No.: 08/866,964

[22] Filed: Jun. 2, 1997

[51] Int. Cl.⁶ .................................................. H01R 25/16
[52] U.S. Cl. .................................................. 439/114
[58] Field of Search .................................. 439/114, 113, 439/212, 135

[56] References Cited

U.S. PATENT DOCUMENTS

| | | | |
|---|---|---|---|
| 3,482,202 | 12/1969 | Wallace et al. | 439/114 |
| 3,922,053 | 11/1975 | Hafer | 439/114 |
| 4,820,178 | 4/1989 | Anderson et al. | 439/114 |
| 4,957,447 | 9/1990 | Hibbert et al. | 439/114 |
| 5,525,068 | 6/1996 | Graham et al. | 439/114 |
| 5,588,852 | 12/1996 | Puerner | 439/135 |

*Primary Examiner*—Gary Paumen
*Attorney, Agent, or Firm*—Martin J. Moran

[57] ABSTRACT

An electrical busway plug-in brick for mounting on a busway housing includes openings which allow access to bus bars running along the length of the housing. Barrier members are preferably positioned across the openings to restrict access of fingers or other similarly sized objects through the openings, while allowing electrical contacts to be made therethrough. The plug-in brick preferably includes a lockable cover which deters unauthorized access to the openings of the plug-in brick. The openings may extend unequal distances through the plug-in brick in order to provide increased creep and strike distance which prevents electrical arcing. The plug-in brick may be mounted on the busway housing by release pockets which prevent destruction of the plug-in brick upon a short circuit by allowing the plug-in brick to be detached from the housing.

15 Claims, 8 Drawing Sheets

5,895,279

1

BUSWAY PLUG IN BRICK AND COVER

FIELD OF THE INVENTION

The present invention relates to an electrical busway system, and more particularly relates to a plug-in brick and cover assembly adapted for mounting in a wall of a bus duct housing.

BACKGROUND INFORMATION

Bus bars for carrying multiphase electrical current for distribution throughout a building or facility are conventionally arranged one above each other in a duct or housing and extend parallel to the longitudinal axis of the duct or housing. Access to the bus bars for taking power off the duct is provided through an opening in the duct by means of a plug-in brick.

A typical bus bar arrangement comprises, from top to bottom, ground, A phase, B phase, C phase, and neutral. Plug-in openings may be spaced about two feet apart in the front and the rear panels of the bus bar housing. Electrical connections are made to the bus bars by way of stabs which are selectively attached in order to obtain the desired electrical system, for example, three wire, three wire with ground, four wire, four wire with ground, etc. The stabs are attached to the bus bars and extend outwardly through one of several compartments or cavities within the brick, which is mounted in a plug-in opening in the front and rear panel of the busway housing.

Many plug-in brick designs include a hinged or slidable door provided over the brick to close off access to the cavities of the brick when no plug-in unit is installed in the brick. In conventional designs, such doors may be easily opened and do not prevent unintentional access to the cavities of the brick. Furthermore, conventional brick cavities allow fingers or other objects of similar size to be easily inserted through the cavities and to come in contact with the electrical bus bars, which can result in severe injury.

A need therefore exists for a plug-in brick and cover assembly which deters unwanted access to the cavities of the brick.

SUMMARY OF THE INVENTION

The present invention relates to an electrical busway plug-in brick for mounting on a busway housing. The plug-in brick has openings which allow access to bus bars running along the length of the housing. The bus bars may comprise ground, A phase, B phase, C phase and neutral bus bars, each of which may be accessed through an opening in the plug-in brick. Barrier members are preferably positioned across the openings to restrict access through the openings to thereby prevent fingers or other similarly sized objects from coming in contact with the electrical bus bars. When making electrical connections to the bus bars, contact fingers are guided by the barrier members into alignment with bus bar stabs. The barrier members thus serve the dual purpose of aligning the contact fingers with the bus bar stabs and preventing human fingers or other similarly sized objects from coming in contact with the bus bars. The plug-in brick preferably includes a cover reversibly mounted on the brick. The cover preferably requires a tool for opening and deters unauthorized access to the openings of the plug-in brick. The openings of the plug-in brick preferably include raised portions which prevent water or other unwanted debris from entering the openings. The openings preferably extend unequal distances through the plug-in brick in order to increase creep and strike distances.

2

An object of the present invention is to provide an electrical busway plug-in brick including a base, a cover reversibly mounted on one side of the base and fastened on another side of the base, multiple openings extending through the base for allowing electrical connections to be made through the openings, and a barrier member extending across at least one of the openings for restricting access through the opening.

Another object of the present invention is to provide an electrical busway plug-in brick assembly including an electrical busway housing, multiple bus bars extending within the housing, and a plug-in brick mounted on the housing. The plug-in brick preferably includes a base including at least one release pocket for releasably securing the base to the busway housing, and multiple openings extending through the base for allowing electrical connections to the bus bars through the openings.

These and other objects of the present invention will be more fully understood from the following description of the invention.

DESCRIPTION OF THE PREFERRED EMBODIMENTS

Figure 1:
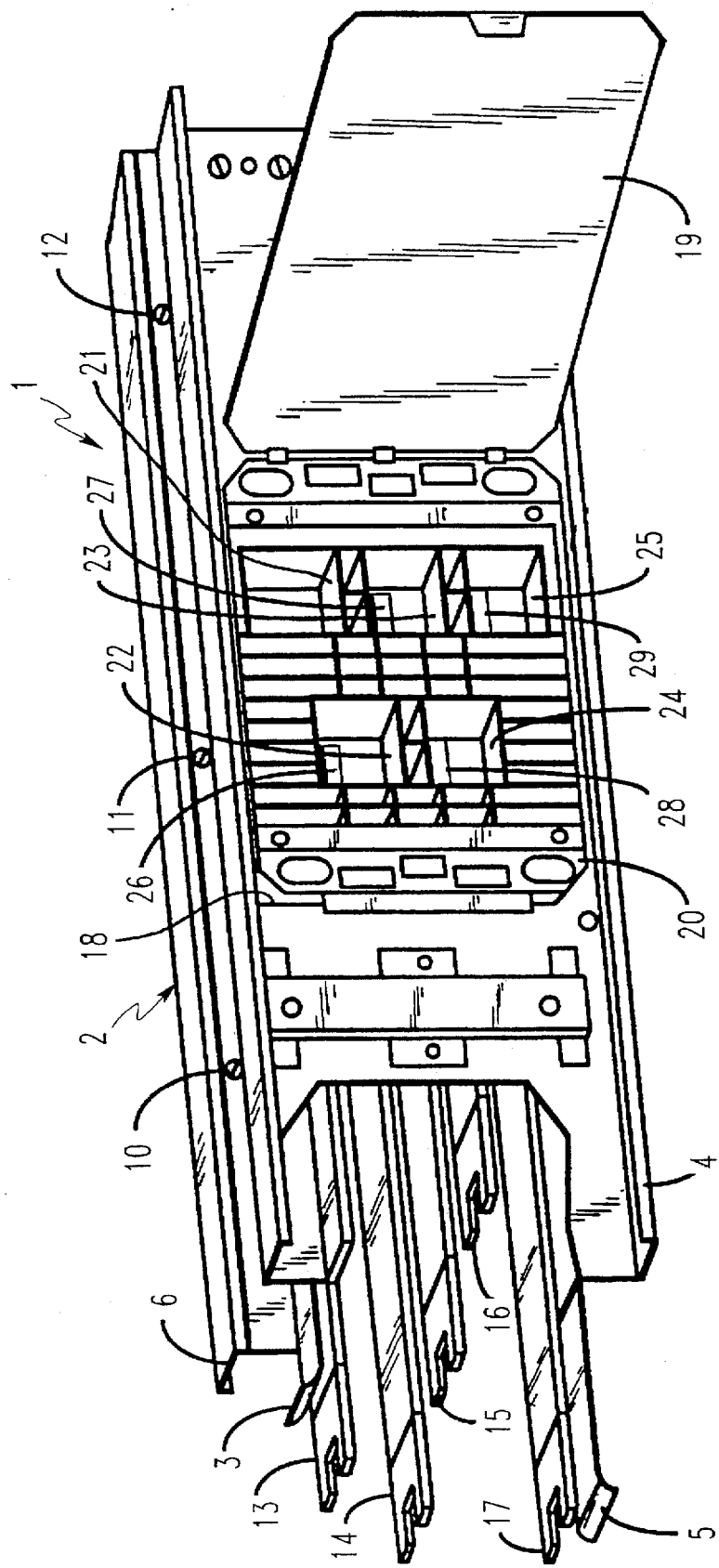
FIG. 1 is a perspective view of a conventional busway system including a plug-in brick having cavities for access to bus bars located inside the busway housing.

FIG. 1 shows a conventional busway system 1 which is a three-phase, three wire plug-in busway system. The busway system 1 includes a housing 2 having a top channel 3, a front cover 4, a bottom channel 5 and a rear cover 6. These components may be fastened together by any suitable means such as bolts 10, 11 and 12. Housing members 3, 4, 5 and 6 are typically formed from steel. The housing members 3, 4, 5 and 6 enclose several electrically conductive bus bars 13, 14, 15, 16 and 17 which run longitudinally and parallel relative to each other in the housing 2. The bus bars 13, 14, 15, 16 and 17 comprise ground, A phase, B phase, C phase and neutral, respectively. The bus bars 13, 14, 15, 16 and 17 are typically made of copper or aluminum, are about three inches wide and are generally insulated by a heat-resistant layer of insulation.

The system shown in FIG. 1 includes a plug-in opening 18 in the front cover 4, which may be one of several openings located along the length of the housing 2. The plug-in opening 18 accepts a plug-in assembly comprised of a brick 20 and a hinged door 19. The brick 20 includes openings 21, 22, 23, 24 and 25. Opening 21 allows access to the ground bus bar 13. Openings 22, 23, 24 and 25 allow access to the bus bars 14, 15, 16 and 17, respectively, by means of stabs 26, 27, 28 and 29 which partially extend through the openings to provide for electrical connections. The stabs 26, 27, 28 and 29 extend perpendicularly from the bus bars 14, 15, 16 and 17, respectively.

While the busway system 1 shown in FIG. 1 operates satisfactorily, it does not inhibit unauthorized entry and does not prevent fingers or other similarly sized objects from being inserted through the openings 21, 22, 23 and 24 where they can contact the electrically active stabs 25, 26, 27 and 28.

Figure 2:
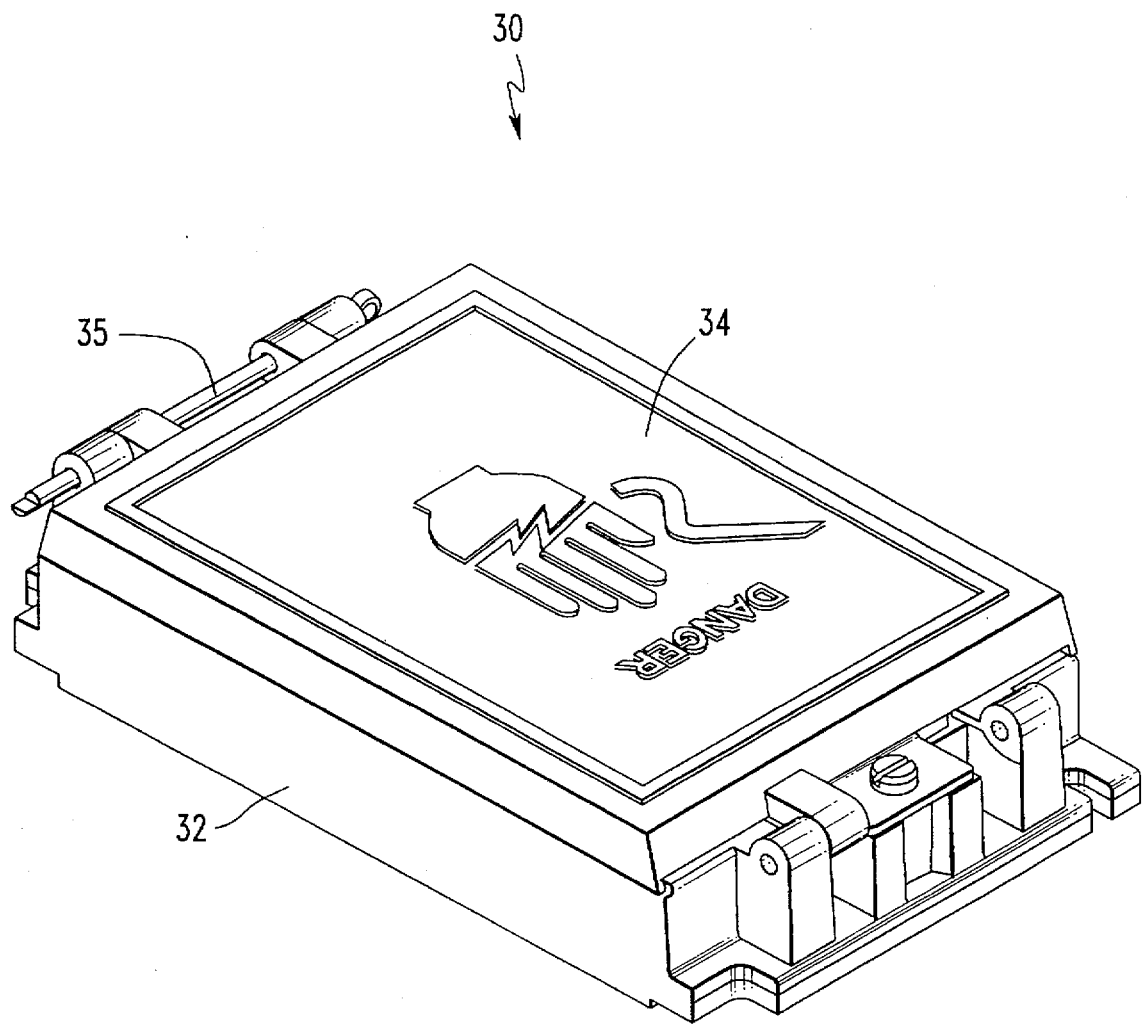
FIG. 2 is a perspective view of a busway plug-in brick and cover assembly in accordance with an embodiment of the present invention.

FIG. 2 is a perspective view showing a plug-in brick and cover assembly 30 in accordance with an embodiment of the present invention. The assembly 30 includes a plug-in brick 32 which forms the base of the assembly and a cover 34 rotatably mounted on the base 32 by a hinge pin 35. The plug-in brick 32 and cover 34 may be made from any suitable material. Preferably, the plug-in brick 32 and cover 34 comprise polymeric material such as polycarbonate, polyester or epoxy. In a preferred embodiment, the components comprise 20% glass polycarbonate.

Figure 3:
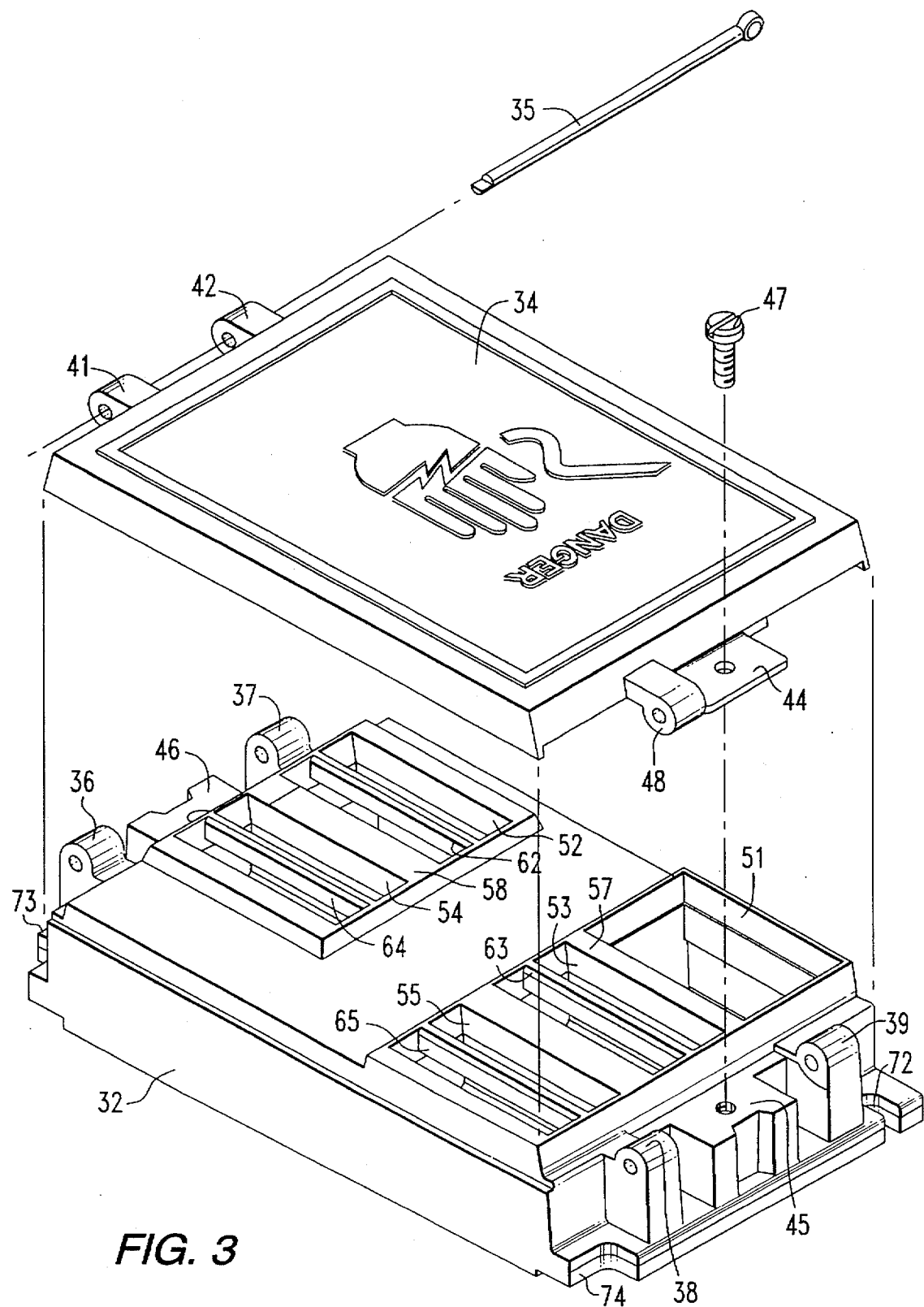
FIG. 3 is a perspective assembly view showing the component parts of the busway plug-in brick and cover of FIG. 2.

As shown most clearly in the perspective assembly drawing of FIG. 3, the cover 34 may be reversibly mounted on either side of the plug-in brick 32 by the base hinge members 36, 37, 38 and 39. Hinge members 41 and 42 extending from the side of the cover 34 may be mounted adjacent the base hinge members 36 and 37 on the left side of the plug-in brick 32 as shown in FIG. 3. Alternatively, the cover hinge members 41 and 42 may be mounted on the opposite side of the plug-in brick 32 adjacent the base hinge members 38 and 39. The hinge pin 35, or any other suitable fastener, allows the cover 34 to be easily mounted on the left or right side of the plug-in brick 32.

The cover 34 may be fastened to the plug-in brick 32 in a closed position by any suitable fastener such as a screw 47 which passes through a fastener plate 44 extending from the side of the cover 34. In the orientation shown in FIGS. 2 and 3, when the cover 34 is in the closed position, the cover fastener plate 44 rests against a flat portion 45 extending from the plug-in brick 32. Alternatively, if the cover 34 is hinged at the opposite side of the plug-in brick 32, the cover fastener plate 44 rests against another flat portion 46 extending from the opposite side of the plug-in brick 32.

A locking tab 48 extending from the cover 34 may be secured to the base hinge member 37 or 38 by any suitable locking mechanism. For example, a lock such as a wire lead lock (not shown) may be threaded through the cover tab 48 and the base hinge member 38 in order to prevent or deter unauthorized opening of the cover 34 and to indicate the occurrence of any tampering with the cover 34.

Figure 4:
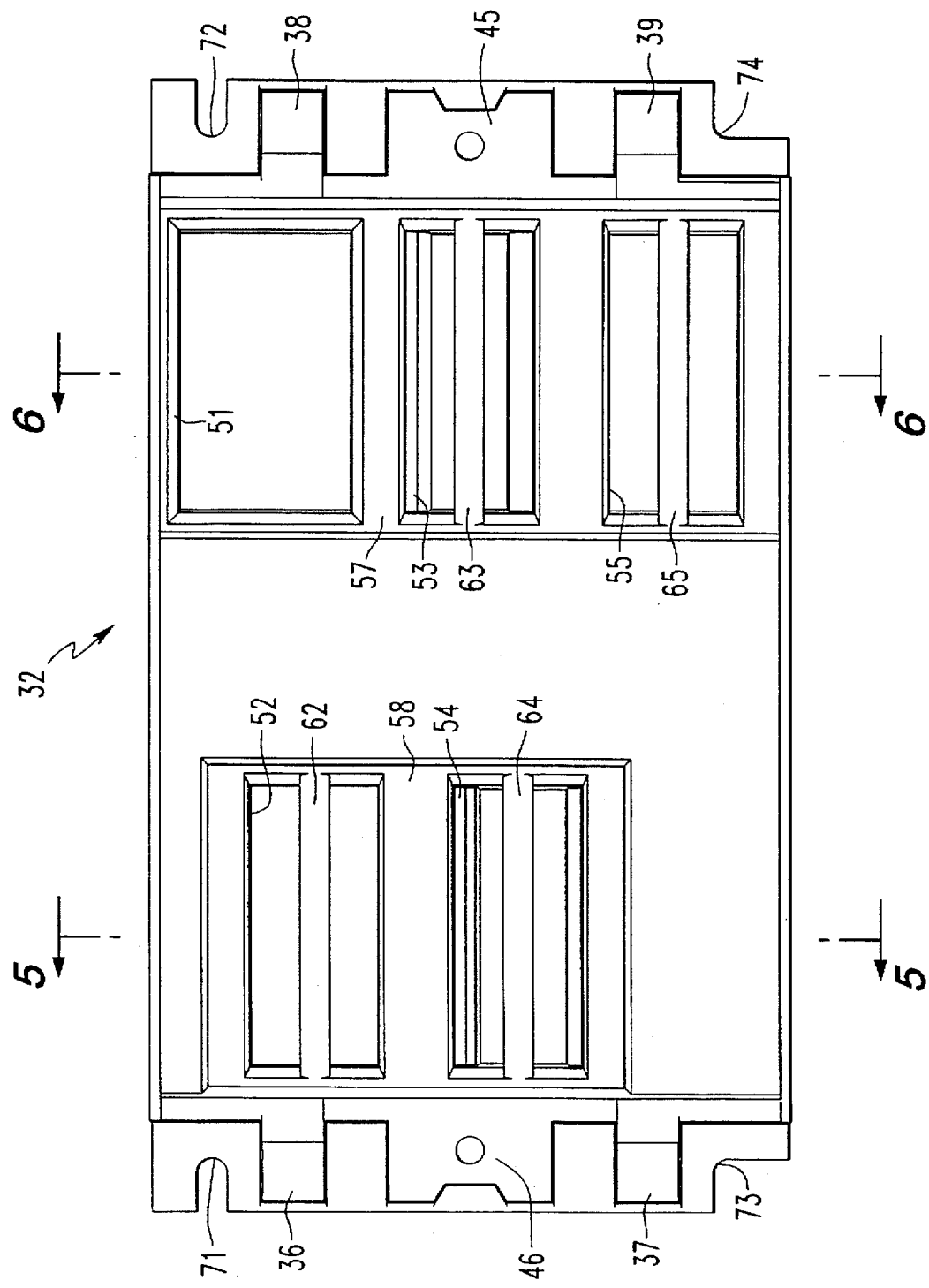
FIG. 4 is a top plan view of a busway plug-in brick in accordance with an embodiment of the present invention.

As shown most clearly in FIGS. 3 and 4, the plug-in brick 32 includes several openings that allow access through the plug-in brick 32 when it is mounted on a bus bar housing. In the preferred embodiment, the plug-in brick 32 includes five openings. However, any suitable number of openings may alternatively be provided. The plug-in brick 32 includes a ground opening 51, an A phase opening 52, a B phase opening 53, a C phase opening 54 and a neutral opening 55. As described more fully below, these openings allow access to various electrical bus bars in a busway housing.

In the embodiment shown in FIGS. 3 and 4, the ground opening 51, B phase opening 53 and neutral opening 55 are adjacent each other on one side of the plug-in brick 32, while the A phase opening 52 and C phase opening 54 are next to each other on the opposite side of the plug-in brick. The ground, B phase and neutral openings 51, 53 and 55 preferably include a raised portion or escutcheon 57 which extends from the substantially planar face of the plug-in brick 32. Likewise, the A phase and C phase openings 52 and 54 preferably include a raised portion 58 which extends from the face of the plug-in brick 32. The raised portions 57 and 58 prevent dust and water from entering the openings 51, 52, 53, 54 and 55 by channeling water and debris away from the opening.

In accordance with the present invention, barrier members are provided across at least some of the openings 51, 52, 53, 54 and 55 for restricting access through the openings. In the embodiment shown in FIGS. 3 and 4, barrier rods 62, 63, 64 and 65 are provided across the A phase, B phase, C phase and neutral openings 52, 53, 54 and 55, respectively. The barrier rods 62, 63, 64 and 65 preferably extend between the two opposing short sides of each of the rectangular openings 52, 53, 54 and 55, and are located substantially midway between the opposing long sides of each rectangular opening. As discussed more fully below, this configuration not only restricts access of fingers and the like through the openings, but also acts as a guide means to facilitate electrical connections through the openings.

As shown in FIGS. 3 and 4, the plug-in brick 32 preferably includes slots 71 and 72 in the short sides of the rectangular plug-in brick 32 which receive screws, bolts, rivets or any other suitable type of fastener for mounting the plug-in brick on a busway housing. The plug-in brick 32 also includes release pockets 73 and 74 located at the corners of the plug-in brick opposite the slots 71 and 72. The release pockets 73 and 74 also receive any suitable type of fastener such as screws, bolts or rivets. The release pockets 73 and 74 prevent damage to the plug-in brick 32 upon the occurrence of a short circuit within the busway housing. As known in the art, an electrical busway short circuit creates an extremely large electromagnetic field which can rupture the busway housing in a direction transverse to the longitudinal direction of the bus bars. Such short circuits and resultant rupture of the busway housing can destroy conventional plug-in brick assemblies by pulling them apart. However, due to the use of the release pockets 73 and 74, the plug-in brick 32 of the present invention is not as readily torn apart by rupture of the busway housing because the screws or other fasteners received within the release pockets are free to slide away from the plug-in brick 32. After a fault, the brick 32 remains attached to the housing and continues to prevent access to the live bus bars, thereby maintaining protection integrity.

Figure 5:
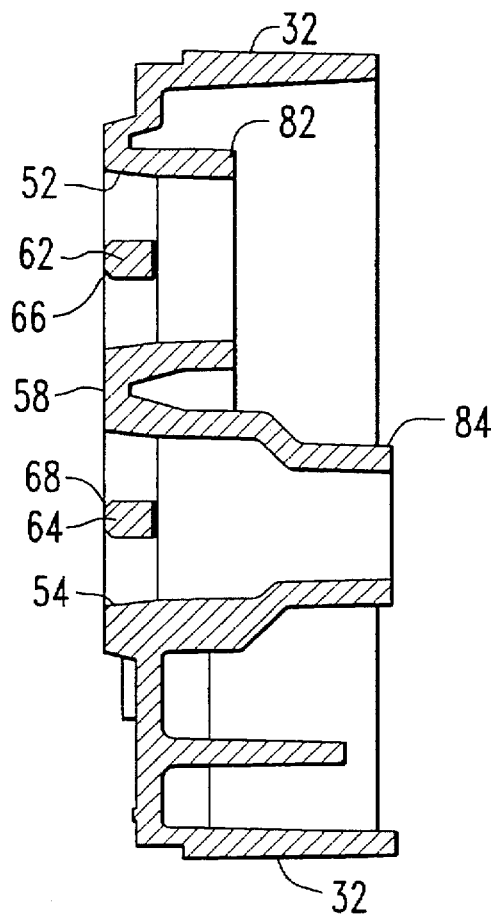
FIG. 5 is a side cross-sectional view taken along lines 5—5 of FIG. 4.
Figure 6:
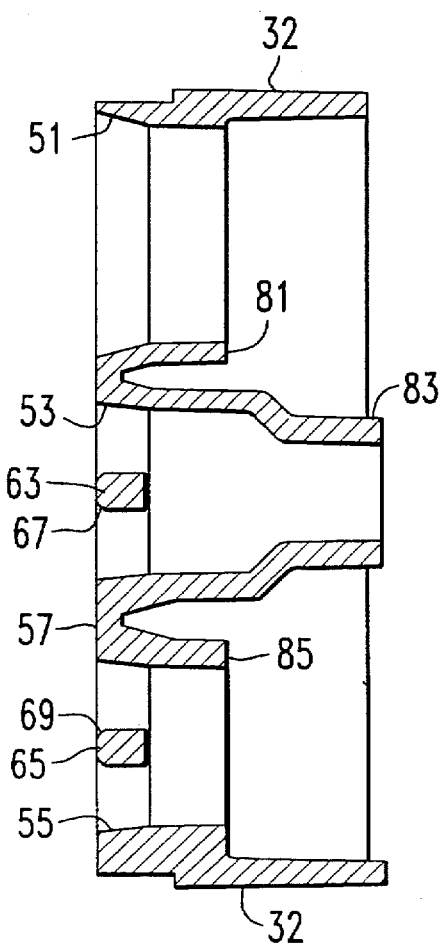
FIG. 6 is a side cross-sectional view taken along lines 6—6 of FIG. 4.

FIGS. 5 and 6 are cross-sectional views through the plug-in brick 32 shown in FIG. 4. In FIG. 5, the A phase opening 52 and C phase opening 54 are shown, while in FIG. 6, the ground opening 51, B phase opening 53 and neutral opening 55 are shown. The A phase, B phase, C phase and neutral barrier rods 62, 63, 64 and 65 are also shown in cross-section. The barrier rods preferably include tapered portions 66, 67, 68 and 69 which facilitate the insertion of electrical contact fingers through the openings.

As shown in FIG. 5, the A phase opening 52 includes an extension 82, while the C phase opening 54 includes an extension 84. The extensions 82 and 84 are preferably of unequal length such that the A phase and C phase opening 52 and 54 extend an unequal distance through the plug-in brick 32. As shown in FIG. 6, the ground, B phase and neutral openings 51, 53 and 55 include extensions 81, 83 and 85, respectively. The extensions 83 and 85 are preferably of unequal length such that the B phase and neutral openings 53 and 55 extend an unequal distance through the plug-in brick 32. As more fully described below, the extensions 81, 82, 83, 84 and 85 provide increased creep distances which prevent unwanted electrical arcing.

Figure 7:
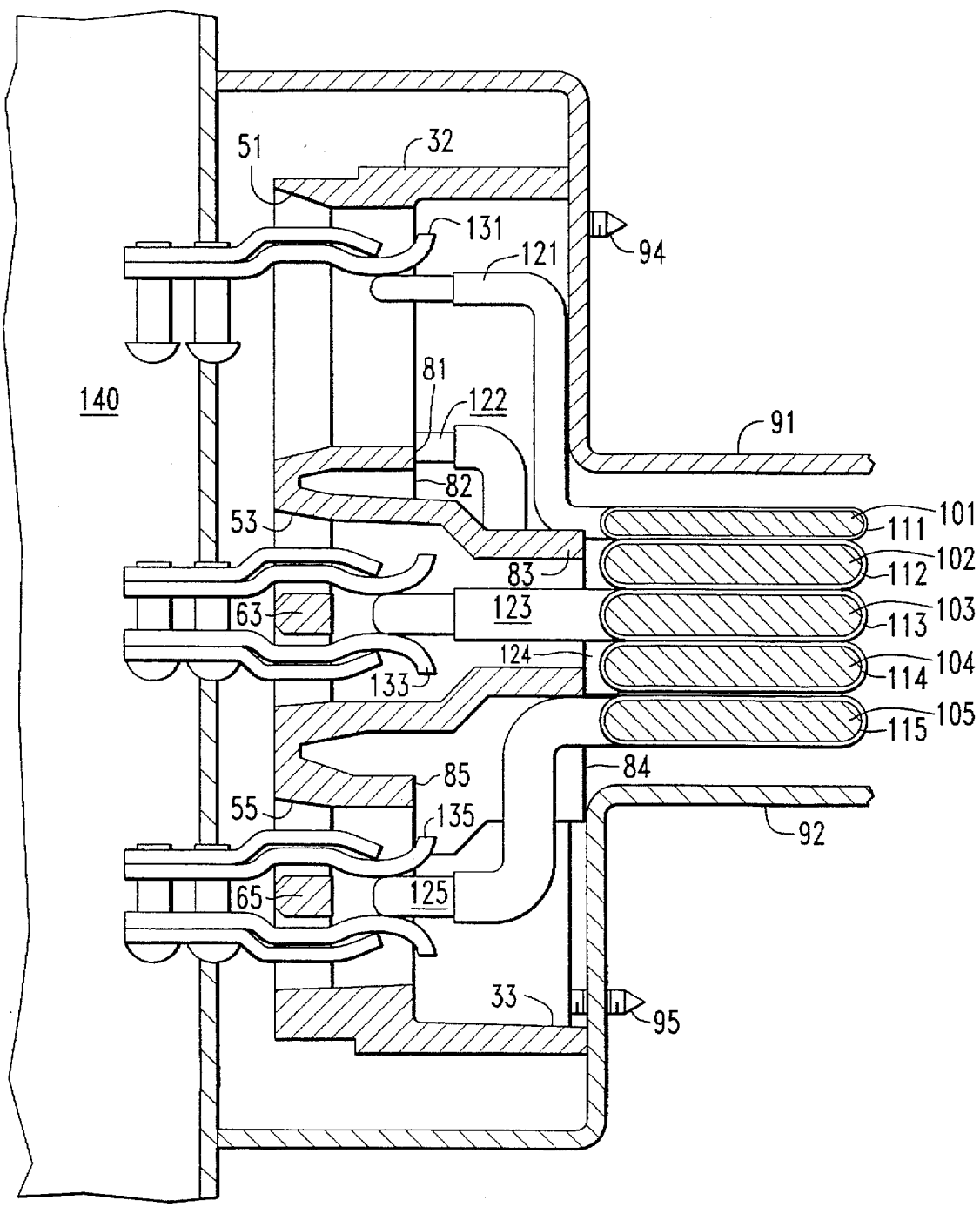
FIG. 7 is a partially schematic side cross-sectional view of a busway plug-in brick similar to that shown in FIG. 6, showing the connection of contact fingers to bus bar stabs in accordance with an embodiment of the present invention.

FIG. 7 illustrates a plug-in brick 32 mounted in a busway housing. The housing includes a housing top 91 and a housing bottom 92. Fasteners such as metal cutting screws 94 and 95 are used to secure the plug-in brick 32 to the housing top and bottom panels 91 and 92. The screws 94 and 95 are received in the slots 71 and 72 and release pockets 73 and 74 of the plug-in brick 32, which are shown most clearly in FIG. 4.

As shown in FIG. 7, several bus bars are positioned in the busway housing between the top and bottom panels 91 and 92. In the embodiment shown in FIG. 7, a ground bus bar 101, A phase bus bar 102, B phase bus bar 103, C phase bus bar 104 and neutral bus bar 105 are provided in the housing. However, the number and type of bus bars may be varied as desired. Suitable bus bar configurations include three wire, three wire with external ground, three wire with external and internal ground, three wire with external and isolated ground, four wire, four wire with external ground, four wire with external and internal ground and four wire with external and isolated ground. The bus bars typically carry currents above 200 Amps, for example, from about 600 to about 5,000 Amps. The bus bars 101, 102, 103, 104 and 105 typically include insulation layers 111, 112, 113, 114 and 115, respectively. The ground opening 51 is sized to accommodate various types of ground connections such as housing grounds, isolated grounds, internal grounds and combinations thereof.

The A phase, B phase, C phase and neutral bus bars 101, 102, 103, 104 and 105 have conducting stabs 121, 122, 123, 124 and 125 extending therefrom, respectively. The stabs 122, 123, 124 and 125 extend from the bus bars toward the A phase, B phase, C phase and neutral openings 52, 53, 54 and 55, respectively. FIG. 7 further illustrates the unequal distances that the extensions 81, 82, 83, 84 and 85 extend through the plug-in brick 32.

When making electrical connections through the plug-in brick 32 to the various bus bars, electrical contact fingers are inserted through the desired openings. In FIG. 7, a B phase contact finger 133 is inserted in the B phase opening 53 where it contacts the B phase stab 123. The contact finger 133 straddles the B phase barrier rod 63, which is aligned with the stab 123. Upon insertion of the contact finger 133, the B phase barrier rod 63 acts to align the contact finger with the B phase stab 123. In a similar manner, a neutral contact finger 135 is inserted in the neutral opening 55 where it contacts the neutral stab 125. The neutral barrier rod 65 acts to align the contact finger 135 with the neutral stab 125. The contact fingers 133 and 135 are mounted on a junction box 140 in a known manner.

Figure 8:
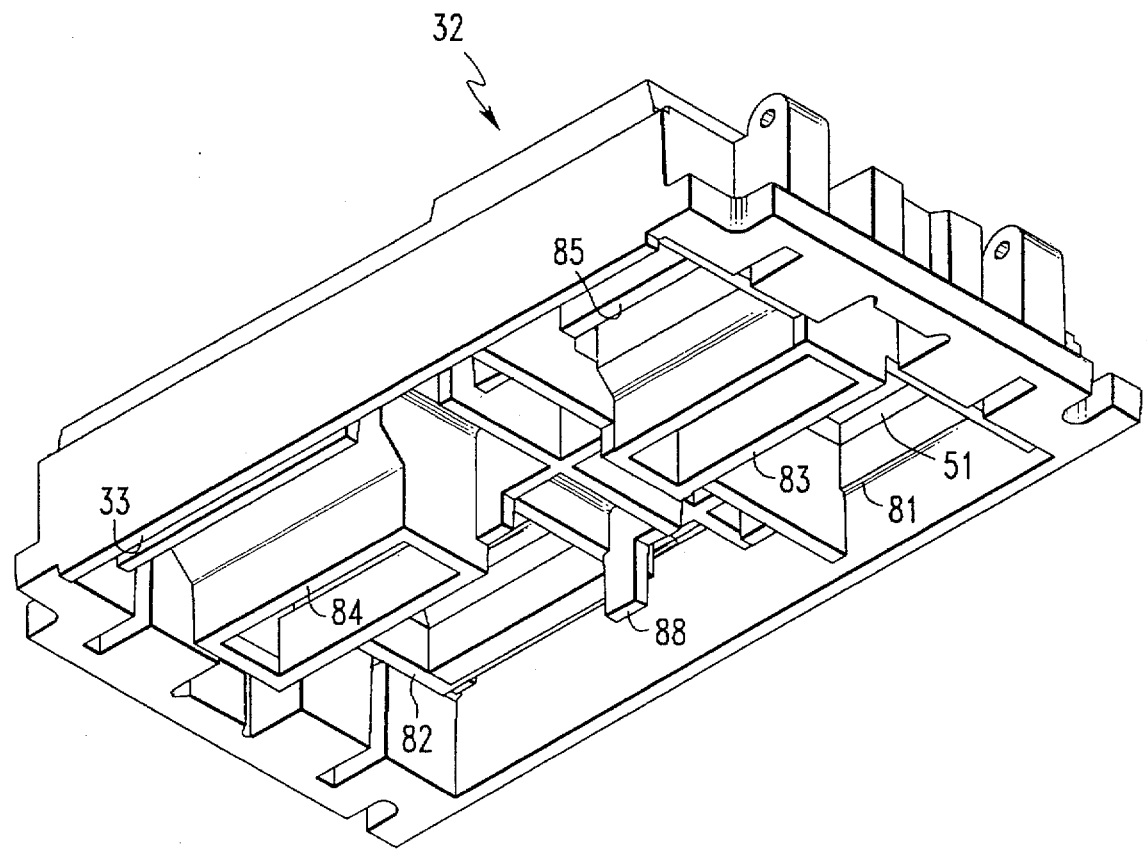
FIG. 8 is a perspective view showing the underside of a busway plug-in brick in accordance with an embodiment of the invention.

FIG. 8 is a perspective view of the underside of a plug-in brick 32 in accordance with a preferred embodiment of the present invention. A stiffening structure 88 is preferably provided in the underside of the plug-in brick 32. The ground, A phase, B phase, C phase and neutral extensions 81, 82, 83, 84 and 85 are illustrated in FIG. 8. The different lengths of these extensions provide increased creep and strike distances which prevent unwanted electrical arcing. For example, the A phase and C phase extensions 82 and 84 provide a large creep distance between the A phase and C phase stabs which prevents or reduces arcing therebetween. Similarly, the B phase and neutral extensions 83 and 85 provide a large creep distance between the B phase and neutral stabs which likewise prevents or reduces arcing. The plug-in brick 32 preferably includes an extended edge 33, to reduce or prevent dust, water and other contaminants from entering the interior of the bus bar housing.

Figure 9:
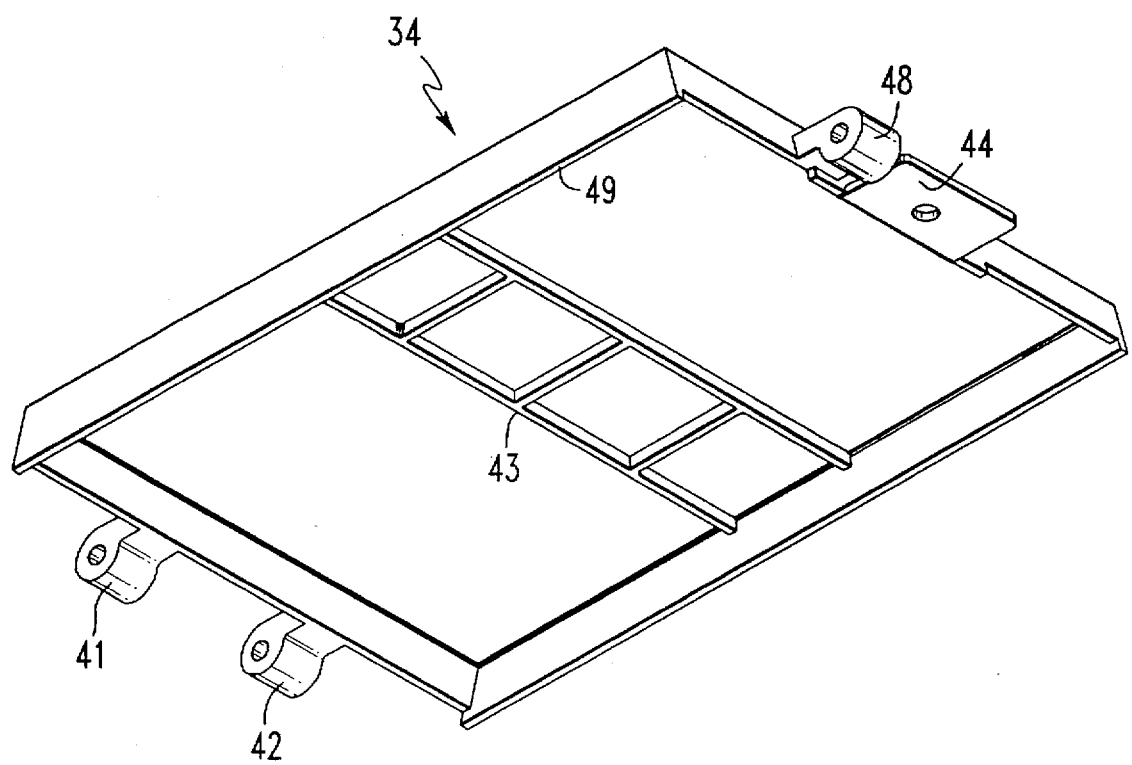
FIG. 9 is a perspective view showing the underside of a busway plug-in brick cover in accordance with an embodiment of the present invention.

FIG. 9 is a perspective view showing the underside of a plug-in brick cover 34 in accordance with a preferred embodiment of the present invention. The cover 34 preferably includes extended sidewalls 49 which contact similarly shaped recesses in the plug-in brick 32 to prevent dust and the like from entering the openings of the plug-in brick. The underside of the cover 34 is substantially planar with a raised portion 43 extending therefrom which provides stiffening. When the cover 34 shown in FIG. 9 is mounted on a plug-in brick 32, as shown in FIG. 2, the raised portion 43 of the cover extends in close proximity to the substantially planar face of the plug-in brick 32. The raised portions 57 and 58 of the plug-in brick 32 also extend in close proximity to the flat planar portions of the underside of the cover 34.

The cover 34 shown in FIG. 9 makes forceful removal of the cover more difficult because the application of force to a localized area of the cover does not result in significant deformation of the cover. For example, if local force is applied at the center of the cover 34, the raised portion 43 contacts the planar face of the plug-in brick 32, thereby essentially preventing inward deformation of the cover 34. Similarly, if localized force is applied toward either side of the face of the cover 34, the planar underside of the cover contacts the raised portions 57 and 58 of the plug-in brick 32, thereby preventing further inward deformation. This configuration, in combination with the use of the lock extension 48 and fastener plate 44, deters forceful or unauthorized entry into the plug-in brick 32.

While specific embodiments of the present invention have been described herein, it will appreciated by those skilled in the art that various modifications, changes and adaptations may be made without departing from the scope of the present invention, as set forth in the following claims.

What is claimed is:

1. An electrical busway plug-in brick comprising:
    a base;
    a cover reversibly mounted on a first side of the base including fastening means for securing the cover on a second side of the base;
    a plurality of openings extending through the base for allowing electrical connections to be made through the openings; and
    a barrier member extending at least partially across at least one of the openings for restricting access through the at least one opening while still allowing the electrical connections to be made.

2. The electrical busway plug-in brick of claim 1, wherein the cover is hinged to the first side of the base and the fastening means includes a mechanical fastener secured to the second side of the base.

3. The electrical busway plug-in brick of claim 2, wherein the base includes hinge members on the first and second sides thereof for reversibly mounting the cover on the base.

4. The electrical busway plug-in brick of claim 3, wherein the cover includes a locking tab with a hole therein and at least one of the hinge members comprises a hole that is aligned with the locking tab hole when the cover is in a closed position.

5. The electrical busway plug-in brick of claim 1, wherein the base comprises a substantially planar front face through which ground, A phase, B phase, C phase and neutral openings pass, and the openings include at least one raised portion extending from the substantially planar face.

6. The electrical busway plug-in brick of claim 5, wherein the ground, B phase and neutral openings are adjacent each other on a side of the base and include a raised portion extending from the substantially planar front face, and the A phase and C phase openings are adjacent each other on an opposite side of the base and include a raised portion extending from the substantially planar face.

7. The electrical busway plug-in brick of claim 6, wherein the cover comprises a substantially planar inner surface which contacts the raised portions of the ground, A phase, B phase, C phase and neutral openings when the cover is in a closed position.

8. The electrical busway plug-in brick of claim 7, wherein the cover further comprises a reinforcement portion extending from the inner surface of the cover toward the substantially planar front face of the base, the reinforcement portion being located between the raised portions of the openings when the cover is in the closed position.

9. The electrical busway plug-in brick of claim 1, wherein the cover comprises at least one extended sidewall which is received in a recess of the base when the cover is in a closed position.

10. The electrical busway plug-in brick of claim 1, wherein the plurality of openings comprises ground, A phase, B phase, C phase and neutral openings, and the openings extend an unequal distance through the base.

11. The electrical busway plug-in brick of claim 10, wherein the A phase and C phase openings are adjacent each other on a side of the base and extend an unequal distance through the base with respect to each other, and the B phase and neutral openings are adjacent each other on an opposite side of the base and extend an unequal distance through the base with respect to each other.

12. The electrical busway plug-in brick of claim 1, wherein the plurality of openings comprises substantially rectangular A phase, B phase, C phase and neutral openings, and a barrier member extends between two opposing sides of each of the A phase, B phase, C phase and neutral openings.

13. The electrical busway plug-in brick of claim 1, wherein the base comprises at least one release pocket for releasably securing the base to a busway housing.

14. The electrical busway plug-in brick of claim 13, wherein the base is substantially rectangular and includes opposing longitudinal sides and opposing transverse sides, and the at least one release pocket comprises a cut-out in at least one corner defined by the intersection of the longitudinal and transverse sides.

15. The electrical busway plug-in brick of claim 14, wherein each of the transverse sides includes a slot adjacent a first one of the longitudinal sides extending substantially parallel with the first longitudinal side, and a second one of the longitudinal sides includes two of the release pockets comprising substantially 90 degree cut-outs in corners defined by the intersections of the second longitudinal side and the transverse sides.

* * * * *